United States Patent
Valieri

(10) Patent No.: US 11,111,186 B2
(45) Date of Patent: Sep. 7, 2021

(54) ACID COMPOSITION BASED ON LEONARDITE AND AMINO ACIDS

(71) Applicant: SIPCAM INAGRA, S.A., Valencia (ES)

(72) Inventor: Gianluca Valieri, Valencia (ES)

(73) Assignee: SIPCAM INAGRA, S.A., Valencia (ES)

(*) Notice: Subject to any disclaimer, the term of this patent is extended or adjusted under 35 U.S.C. 154(b) by 48 days.

(21) Appl. No.: 15/552,199

(22) PCT Filed: Feb. 4, 2016

(86) PCT No.: PCT/ES2016/070065
§ 371 (c)(1),
(2) Date: Aug. 18, 2017

(87) PCT Pub. No.: WO2016/132000
PCT Pub. Date: Aug. 25, 2016

(65) Prior Publication Data
US 2018/0029946 A1 Feb. 1, 2018

(30) Foreign Application Priority Data
Feb. 20, 2015 (ES) .................. ES201530214

(51) Int. Cl.
*C05F 11/02* (2006.01)
*C08L 97/00* (2006.01)
*C08H 7/00* (2011.01)
*C05G 5/20* (2020.01)
*C05F 11/10* (2006.01)

(52) U.S. Cl.
CPC .............. *C05F 11/02* (2013.01); *C05F 11/10* (2013.01); *C05G 5/20* (2020.02); *C08H 6/00* (2013.01); *C08L 97/002* (2013.01)

(58) Field of Classification Search
CPC ........ C05F 11/02; C05F 11/10; C08L 97/002; C05G 3/0064; C08H 6/00
See application file for complete search history.

(56) References Cited

U.S. PATENT DOCUMENTS

| 4,698,090 A | 10/1987 | Marihart, Jr. |
| 2002/0174697 A1 | 11/2002 | Reid et al. |

(Continued)

FOREIGN PATENT DOCUMENTS

| CN | 1371887 | 10/2002 |
| CN | 102701853 | 10/2012 |
| WO | 2004002921 | 1/2004 |

(Continued)

OTHER PUBLICATIONS

Park W. Waldroup and Frances Yan. "Compositional values of commercial sources of feather meal for use in poultry diets" .Poultry Science Department, University of Arkansas, 2014.*

(Continued)

*Primary Examiner* — Jennifer A Smith
(74) *Attorney, Agent, or Firm* — Davis Wright Tremaine LLP; Heather M. Colburn; Allison K. Vagner

(57) ABSTRACT

This invention refers to an acid composition containing leonardite, amino acids and surfactants for use as fertiliser, biostimulant and/or nutrient and to a procedure for obtaining this composition.

53 Claims, 1 Drawing Sheet

(56) References Cited

U.S. PATENT DOCUMENTS

| | | | |
|---|---|---|---|
| 2013/0145805 A1* | 6/2013 | Olson | C05D 9/00 71/6 |
| 2014/0179520 A1 | 6/2014 | Haschemeyer | |

FOREIGN PATENT DOCUMENTS

| WO | 2010006233 | 1/2010 |
|---|---|---|
| WO | 2013040403 | 3/2013 |
| WO | 2015179687 | 11/2015 |

OTHER PUBLICATIONS

Tan, Kim H. Humic matter in soil and the environment: principles and controversies. CRC Press, 2014.*

Zhou, April Yongdong. Protein content and amino acid profile in New Zealand Undaria pinnatifida. Diss. Auckland University of Technology, 2012.*

Kotake, Naoya, et al. "Influence of dry and wet grinding conditions on fineness and shape of particle size distribution of product in a ball mill." Advanced Powder Technology 22.1 (2011): 86-92.*

Youtube. "How to Make Kelp Fertilizer with Kelp4less.com" Kelp4less. <https://www.youtube.com/watch?v=JDOv6MyDk-0> Dec. 7, 2012 (Year: 2012).*

Self Nutrition Data. "Seaweed, kely, raw" <https://nutritiondata.self.com/facts/vegetables-and-vegetable-products/2617/2> Feb. 20, 2014 (Year: 2014).*

Cultivo Dosis et al., "Blackjak Dosis Y Modo De Empelo," 2013. Retrieved from the Internet: URL:http://sipcamiberia.es/admin/producto/documentodownload/5Wtak410w-5138757c728115-87656712/Folleto_Blackjak_2013.pdf [retrieved on Mar. 2-17, 2011] 2 pages.

Ertani, A. et al. "Effect of Commercial Lignosulfonate-Humate on *Zea mays* L. Metabolism," J. Agric. Food Chem., 2011, 59(22): 11940-11948.

"Perfectose hoja Informativa," 2014. Retrieved from the Internet: URL:http://sipcamiberia.es/es/productos/15/nutrientes/85/peifectose.html [retrieved on Mar. 11, 2016] 2 pages.

Office Action, dated Apr. 30, 2015, received in Spanish Patent Application No. 201530214.

International Search Report, dated Apr. 21, 2016, received in International Application No. PCT/ES2016/070065.

* cited by examiner

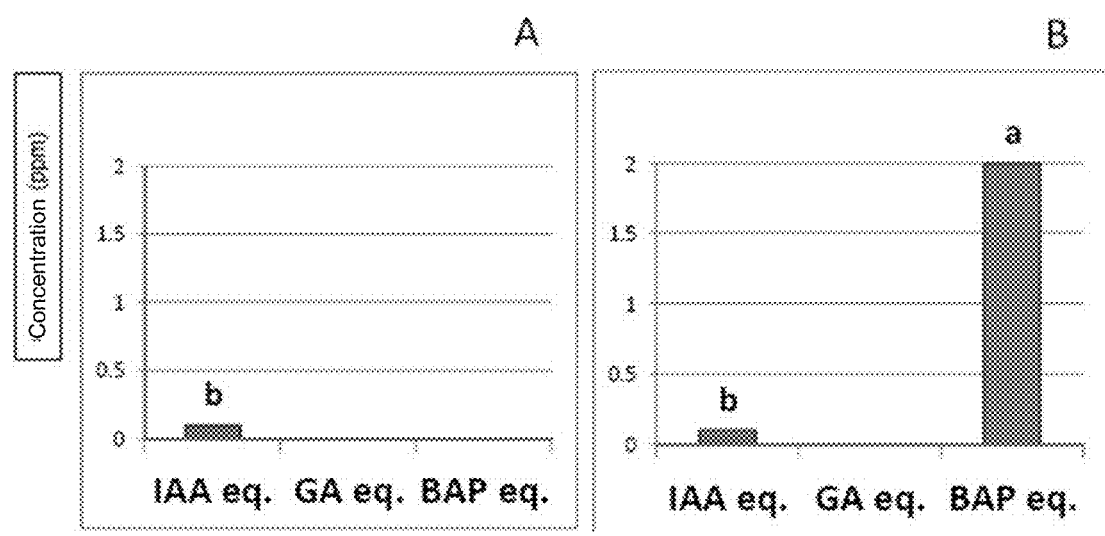

ACID COMPOSITION BASED ON LEONARDITE AND AMINO ACIDS

CROSS-REFERENCE TO RELATED APPLICATIONS

The present application is a U.S. National Stage entry under 35 U.S.C. § 371 of International Application No. PCT/ES2016/070065, filed on Feb. 4, 2016, designating the United States of America and published in Spanish on Aug. 25, 2016, which in turn claims priority to Spanish Application No. P201530214, filed on Feb. 20, 2015, each of which is hereby incorporated by reference in its entirety.

FIELD OF THE INVENTION

This invention lies within the general field of biological products for agriculture and it especially refers to a composition based on leonardite.

STATE OF THE ART

Leonardite is an organic material associated with lignite in which the process of transformation into coal has not terminated. It differs from damp peat because of its higher degree of oxidation. It is also called humalite or lignite.

Leonardite consists of humic substances including humic acids themselves, notable for their high molecular weight (up to 50,000 KD) and that are soluble in alkaline ambits but precipitate in acidic solutions, fulvic acids which generally have a molecular weight below 5,000 KD and soluble in acidic and alkaline ambits and humin.

Leonardite is insoluble in water and to be able to use it, its solubility must be increased. For this it is usually attacked with alkaline products such as NaOH, KOH or similar to obtain the relevant potassium, sodium, ammonia, etc, salts. The alkaline attack process is normally applied to obtain commercial products, whether solid or liquid, but these products are incompatible with acidic ambits since they quickly re-form the original humic acid, which precipitates forming flocculations that make the application of the product in the field difficult or impossible since they clog the filters and nozzles in the equipment. This technical problem is further complicated the more the products that are to be applied with it in the same field application since more precipitate may be produced as a consequence of the precipitation of the humates. Remembering that, generally, the field applications of phytosanitary products usually recommend acidification, the need and at the same time the technical difficulty of applying traditional formulas of leonardite (humic acids) together with other phytosanitary products and/or nutrients is clear.

Another problem is the mixing (ready mixed or mixed in the field) with amino acids or products containing them, since their acidic pH makes them a potential cause of precipitation and flocculation for the reasons given above.

The properties of leonardite have been the subject of various research efforts and patent applications, such as patent applications CN103553761, WO2013040403 and EP0284339 which describe various compositions containing leonardite and other compounds such as amino acids. However, they all have a basic pH derived from the treatment with alkali mentioned above, the problem remaining of the incompatibility in the mix with other acidic substances or in applications requiring an acidic ambit.

It is therefore necessary to provide a composition based on leonardite that includes amino acids and that is stable and functional with an acidic pH without producing the precipitation of the amino acids or the humic acids as well as other substances applied to the mix when necessary.

DESCRIPTION OF THE INVENTION

This invention solves the problems described in the state of the art since it provides a stable acid composition of leonardite, amino acids and surfactants that is functional and the components of which do not precipitate in the pre-prepared mix or in the field mix with other acidic substances.

Thus, in a first aspect, this invention refers to an acid composition (the composition of this invention from now on) that comprises: leonardite, amino acids and surfactants for use as a fertiliser, biostimulant and/or nutrient.

In this invention, leonardite comprises between 50% and 90% w/w of the total humic substance (on dry base), preferably between 80% and 90% w/w of the total humic substance (on dry base).

In this invention, surfactant is understood as any compound that can cause a decrease in surface tension or make hydrophobic substances such as humic acids compatible with water. Surfactants are classified according to their function in surfactants, dispersants, compatibilisers, wetting agents, etc. In this invention, surfactants, dispersants, wetting agents, compatibilisers, etc, will generally be considered as coformulants and mutually equivalent in the sense that they do not provide any nutrient substance or biostimulant.

In a more particular aspect, the composition of this invention comprises at least one surfactant selected from the ethoxylated fatty acids, polymeric surfactants, sulphonates, hexitol esters or sulphocarboxylic type surfactants.

More especially, the composition of this invention comprises at least one surfactant selected from ethoxylated iso-alkyl polyglycol ether C3-C13, calcium lignosulphonate, polyethoxylated sorbitan laurate or sodium dioctylsulphosuccinate.

As is well known to those skilled in the art, these surfactants can be promptly replaced with surfactants with functions equivalent to those described, such as, for example: Na lauryl sulphate and its alkyl ester sulphates (wetting agent), sodium lignosulphonate and/or that of ammonia or similar (dispersants and wetting agents), sodium and/or calcium naphthalene sulphonate and polymeric substances derived from naphthalene sulphonate as well as alkyl derivatives (dispersants), ethoxylated and/or propoxylated fatty acids different to that used in these examples (wetting agents), condensed ethoxy-propoxy chain polymers (dispersants and wetting agents), ethoxylated and/or propoxylated oils (for example ethoxylated castor oil, wetting agent o dispersant), polymers acrylics (compatibiliser and/or dispersant), sodium sulphosuccinates (wetting agents), alkyl diphenyl ether sulphate salts (wetting agents), ethoxylated and/or propoxylated distyryl and tristyryl phenols and corresponding phosphate and/or sulphate salts (dispersants).

In another particular aspect, the amino acids in the composition of this invention are selected from acidic or neutral amino acids.

The amino acids in the composition of this invention may be incorporated as free amino acids or as any source of amino acids such as peptides or polypeptides, preferably from a source of amino acids containing at least 15-20% w/w such as free amino acids, preferably a value of 30-50% w/w. A minimum of 30-40% w/w expressed as total amino acids, preferably a value of 60-80% w/w.

In another particular aspect, the composition of this invention may also comprise other compounds such as excipients, adjuvants, gelling agents, defoamers and/or preservatives.

In another particular aspect, the composition of this invention comprises a gelling agent more specifically the gelling agent is xantham gum.

In another particular aspect, the composition of this invention comprises a defoamer, more specifically the defoamer is silicone oil.

In a second aspect, this invention refers to a procedure (the procedure of this invention from now on) to obtain the composition of this invention that comprises the following steps.
a) preparation of an initial aqueous solution containing the defoamer agent and the surfactants,
b) addition of the source of amino acids to the aqueous solution of step a),
c) addition of the leonardite and its dispersion,
d) milling (micronisation) by wet means of the dispersion obtained in c)
characterized in that the composition has an acidic pH comprised between 3 and 6 and wherein step b), the addition of amino acids, may be made at any time, whether before the micronisation of the dispersion or after it.

In a particular aspect, the procedure of this invention comprises an additional step of the addition of excipients, adjuvants, gelling agents, defoamers and/or preservatives after the micronisation step.

In a more particular aspect of this invention, the pH of the composition is comprised between 3 and 4.5.

DESCRIPTION OF THE FIGURES

FIG. 1 shows the biostimulant effect of the compositions of this invention, activity similar to auxins, activity similar to gibberellins and activity similar to cytokines.

DETAILED DESCRIPTION OF THE INVENTION

Example 1: Composition and Preparation Procedure of the Acid Composition Based on Leonardite with Acidic Amino Acids: Composition 1

Composition 1 was obtained as follows.

Firstly 0.63 kg/L of softened water was added as a dispersion medium, then 0.00220 kg/L of silicone oil emulsified in water was added. Then 0.00275 kg/L of ethoxylated iso-alkyl polyglycol ether C3-C13 (8MOET) was added as a surfactant agent. Once dissolved, 0.00110 kg/L of the preservative 1,2,benzisothiazolin-3-one was added, which dissolved, and then 0.02752 kg/L of calcium lignosulphonate was added as a surfactant agent. 0.24221 kg/L of leonardite was then added and once dispersed by mechanical stirring, the leonardite was micronised in the wet phase in a horizontal ball mill. As a source of humic and/or fulvic acids, this source and quantity provided a total of 170 g/L of the total humic substance to the final formula in its original form of humic and/or fulvic acids.

Once the leonardite had been micronised, 0.15380 kg/L of the protein hydrolyzate was added as a source of free amino acids, which supplied a total of 65 g/L of free amino acids to the final formula. Once dissolved, 0.00220 kg/L of water and 0.04150 kg/L of a gelling agent were added; in this case an aqueous dispersion of 2.70% xantham gum was added and finally 0.04150 kg/L of water was added.

Table 1 shows the components of composition 1. As the composition was prepared, its pH was measured as also shown in Table 1.

TABLE 1 acid composition 1 based on leonardite with acidic amino acids

| Compound | Quantity of finished product (kg/L) | pH of compound | pH of mixture |
|---|---|---|---|
| Softened water | 0.62733 | 7.67 | 7.75 |
| Silicone oil emulsified in water | 0.0022 | 7.8 | 7.85 |
| Iso-alkyl polyglycol ether C3-C13 or ethoxylated fatty acid C3-C13 8MOET | 0.00275 | 7.82 | 8.2 |
| 1,2,benzisothiazolin-3-one | 0.0011 | 9.4 | 9.3 |
| Calcium lignosulphonate | 0.02752 | 8.7 | 9.2 |
| Leonardite, humalite or lignite | 0.24221 | 3.78 | 3.88 |
| Vegetable protein hydrolyzate | 0.1538 | 3.6 | 3.5 |
| Silicone oil emulsified in water | 0.0022 | n/a | 3.52 |
| Water | 0.0022 | n/a | 3.5 |
| 2.7% aqueous dispersion of xantham gum. | 0.0415 | 7.67 | 3.8 |
| Water | 0.0415 | n/a | 3.8 |

Example 2: Composition and Preparation Procedure of the Acid Composition Based on Leonardite with Acidic Amino Acids: Composition 2

Composition 2 was obtained as follows.

Firstly 0.63 kg/L of softened water was added as a dispersion medium, then 0.00220 kg/L of silicone oil emulsified in water was added and then 0.1538 kg/L protein hydrolyzate was added which supplied a total of 65 g/L of free amino acids to the final formula.

0.00275 kg/L of ethoxylated iso-alkyl polyglycol ether C3-C13s 8MOET was then added as a surfactant agent; once dissolved, 0.00110 kg/L of 1,2,benzisothiazolin-3-one was added and then 0.02752 kg/L of calcium lignosulphonate which also acted as a surfactant agent.

0.24221 kg/L of leonardite was added as a source of humic and/or fulvic acids, which supplied a total of 170 g/L of humic substance to the final formula in its original form of humic and/or fulvic acids. Once dispersed, the leonardite was micronised with the same procedure as in example 1 and once the leonardite had been micronised, 0.00220 kg/L of silicone oil emulsified in water was added. 0.00220 kg/L of softened water and 0.04150 kg/L of 2.70% xantham gum aqueous dispersion were then added and finally 0.04150 kg/L of water was added to complete the formula.

As in example 1, as the composition was prepared, its pH was measured as also shown in Table 2.

TABLE 2 acid composition 2 based on leonardite with acidic amino acids

| Compound | Quantity of finished product (kg/L) | pH of compound | pH of mixture |
|---|---|---|---|
| Softened water | 0.62733 | 7.67 | 7.73 |
| Silicone oil emulsified in water | 0.00220 | 7.80 | 7.82 |
| Vegetable protein hydrolyzate | 0.15380 | 3.60 | 3.57 |
| Iso-alkyl polyglycol ether C3-C13 or ethoxylated fatty acid C3-C13 8MOET | 0.00275 | 7.82 | 3.55 |

TABLE 2-continued acid composition 2 based on leonardite with acidic amino acids

| Compound | Quantity of finished product (kg/L) | pH of compound | pH of mixture |
|---|---|---|---|
| 1,2,benzisothiazolin-3-one | 0.00110 | 9.40 | 3.60 |
| calcium lignosulphonate | 0.02752 | 8.70 | 3.63 |
| Leonardite, humalite or lignite | 0.24221 | 3.78 | 3.58 |
| Silicone oil emulsified in water | 0.00220 | n/a | 3.52 |
| Water | 0.00220 | n/a | 3.50 |
| 2.7% aqueous dispersion of xantham gum. | 0.04150 | 7.67 | 3.80 |
| Water | 0.04150 | n/a | 3.80 |

Example 3: Composition and Preparation Procedure of the Acid Composition Based on Leonardite with Neutral Amino Acids: Composition 3

Composition 3 was obtained as follows.

Firstly 0.63 kg/L of softened water was added as a dispersion medium and then 0.00110 kg/L of silicone oil emulsified in water was added. 0.00551 kg/L of ethoxylated iso-alkyl polyglycol ether C3-C13 was added as a surfactant agent. Once dissolved, 0.00165 kg/L of the preservative 1,2,benzisothiazolin-3-one was added, which dissolved. In this case, 0.00551 kg/L of calcium lignosulphonate as a surfactant, 0.01376 of polyethoxylated sorbitan laurate and 0.01376 kg/L of a solution of sodium dioctylsulphosuccinate were added.

Then 0.33579 kg/L of leonardite was added as a source of humic and/or fulvic acids, which supplied a total of 250 g/L of humic substance to the final formula in its original form of humic and/or fulvic acids. After dispersion by mechanical stirring, wet micronisation was carried out in a horizontal ball mill.

0.05031 kg/L of a mixture of amino acids, peptides and polypeptides was added as a source of amino acids, providing a total of 45 g/L of amino acids, peptides and polypeptides to the final formula. 0.00110 kg/L of silicone oil emulsified in water was then added, followed by 0.00110 kg/L of softened water and 0.05400 kg/L of 2.70% xantham gum aqueous dispersion and finally 0.03200 kg/L of water was added to complete the formula.

The pH of the composition as the components of the composition were added is shown in Table 3.

TABLE 3 acid composition 3 based on leonardite with neutral amino acids

| Compound | Quantity of finished product (kg/L) | pH of compound | pH of mixture |
|---|---|---|---|
| Softened water | 0.62953 | 7.48 | 7.58 |
| Silicone oil emulsified in water | 0.0011 | 7.8 | 7.77 |
| Iso-alkyl polyglycol ether C3-C13 or ethoxylated fatty acid C3-C13 8MOET | 0.00551 | 7.86 | 7.81 |
| 1,2,benzisothiazolin-3-one | 0.00165 | 9.5 | 9.44 |
| Calcium lignosulphonate | 0.00551 | 8.47 | 9.38 |
| Polyethoxylated sorbitan laurate | 0.01376 | 7.6 | 9.21 |
| Sodium dioctylsulphosuccinate solution | 0.01376 | 7.48 | 9.23 |

TABLE 3-continued acid composition 3 based on leonardite with neutral amino acids

| Compound | Quantity of finished product (kg/L) | pH of compound | pH of mixture |
|---|---|---|---|
| Leonardite, humalite or lignite | 0.33579 | 3.81 | 3.84 |
| Mixture of amino acids, peptides and polypeptides | 0.05031 | 7.15 | 3.82 |
| Silicone oil emulsified in water | 0.0011 | n/a | 3.83 |
| Water | 0.0011 | n/a | 3.81 |
| 2.7% aqueous dispersion of xantham gum. | 0.054 | 7.71 | 3.85 |
| Water | 0.032 | n/a | 3.84 |

Example 4: Composition and Preparation Procedure of the Acid Composition Based on Leonardite with Neutral Amino Acids: Composition 4

Composition 4 was obtained as follows.

Firstly 0.63 kg/L of softened water was added as a dispersion medium and then 0.00110 kg/L of silicone oil emulsified in water was added followed by 0.05031 kg/L of the source of amino acids, peptides and polypeptides, providing a total of 45 g/L of peptides and polypeptides to the final formula.

Then, 0.00551 kg/L of ethoxylated iso-alkyl polyglycol ether C3-C13 was added as a surfactant agent and once dissolved, 0.00165 kg/L of the preservative 1,2,benzisothiazolin-3-one was added, which dissolved, followed by adding 0.00551 kg/L of calcium lignosulphonate as a surfactant agent. 0.01376 of polyethoxylated sorbitan laurate and 0.01376 kg/L of a solution of sodium dioctylsulphosuccinate were then added. Then 0.33579 kg/L of leonardite was added as a source of humic and/or fulvic acids which supplied a total of 250 g/L of humic substance to the final formula in its original form of humic and/or fulvic acids. After dispersion by mechanical stirring, wet micronisation was carried out in a horizontal ball mill.

Then 0.00110 kg/L of silicone oil emulsified in water was added and then 0.00110 kg/L of softened water and 0.05400 kg/L of 2.70% xantham gum aqueous dispersion were added and finally 0.032 kg/L of water was added for the final adjustment of the contents.

As in the previous examples, Table 4 shows the pH of the composition as the components were added.

TABLE 4 acid composition 4 based on leonardite with neutral amino acids.

| Compound | Quantity of finished product (kg/L) | pH of compound | pH of mixture |
|---|---|---|---|
| Softened water | 0.62953 | 7.48 | 7.58 |
| Silicone oil emulsified in water | 0.0011 | 7.8 | 7.77 |
| Mixture of amino acids, peptides and polypeptides | 0.05031 | 7.15 | 7.04 |
| Iso-alkyl polyglycol ether C3-C13 or ethoxylated C3-C13 fatty acids 8MOET | 0.00551 | 7.86 | 7.84 |
| 1,2,benzisothiazolin-3-one | 0.00165 | 9.5 | 9.38 |
| Calcium lignosulphonate | 0.00551 | 8.47 | 9.33 |
| Polyethoxylated sorbitan laurate | 0.01376 | 7.6 | 9.15 |
| Sodium dioctylsulphosuccinate solution | 0.01376 | 7.48 | 9.12 |
| Leonardite, humalite or lignite | 0.33579 | 3.81 | 3.79 |
| Silicone oil emulsified in water | 0.0011 | n/a | 3.8 |

TABLE 4-continued acid composition 4 based on leonardite with neutral amino acids.

| Compound | Quantity of finished product (kg/L) | pH of compound | pH of mixture |
|---|---|---|---|
| Water | 0.0011 | n/a | 3.78 |
| 2.7% aqueous dispersion of xantham gum. | 0.054 | 7.71 | 3.72 |
| Water | 0.032 | n/a | 3.73 |

As can be seen in the above four examples, some of the compositions had an alkaline pH because of their nature but the pH of the general composition remained acid. On the other hand, the addition of amino acids with acidic or neutral pH did not affect the other components of the composition and neither did they affect the amino acids.

Accelerated stability tests were carried out after preparing the compositions in the examples. A sample of each composition was kept at 54° C. for 14 days (official CIPAC MT 46.3 method) and their aspect checked after the test, its fluidity remaining unaltered compared to the sample at room temperature and not creating deposits or phase separations. It is important to note that stability is an important parameter to be taken into account since, as is well known to those skilled in the art, aqueous liquid formulations based on humic acids usually have stability problems that generate rheological type problems (modification of the viscosity, typically a very high increase) or aspect related problems (phase separations and sedimentation) that make their handling and application in the field difficult or even impossible.

This problem is worsened when considering a ready-mixed formulation such as those presented herein involving the co-existence of humic and fulvic acids in a high concentration with other nutrient substances nutrients such as amino acids in an acidic environment.

It was also found that the final pH of the formulation was unaltered, showing that the chemical forms of the humic substance (leonardite) in the formula continued to be acidic and that no salification occurred.

Example 5: Use of the Composition of this Invention as a Biostimulant

To check the biostimulant effect of the compositions in this invention, a bio test was carried out in which the activity was measured by applying the Audus methods (1972) updated by Nardi and collaborators (Nardi et al, 1996; Ertani et al, 2013; Pizzeghello et al, 2013).

The auxin-like (IAA-like), gibberellin-like (GA-like) and cytokine-like (CK-like) activities were tested for each product by applying four dilutions of the formula (1:10, 1:100, 1:1000, 1:10000) with three biological replicas and three technical replicas.

For each dilution the hormone-like activities were measured for 180 seeds and a total of 720 seeds for each hormonal activity and product, weighting the results compared to a control in sterile water and another applying synthetic reference hormones (IAA, indoleacetic acid, for the auxin-like effect, GA3, gibberellic acid, for the gibberellin-like effect and BAP, benzylaminopurine, for the cytokine-like effect).

The results (FIG. 1) were validated with the Duncan test ($P \leq 0.05$) and SPSS software.

Conclusions from the Results:
Auxin-like effect: the products tested for examples 1 and 3, applied to a dilution of 1:100 show an auxin-like (IAA-like) effect on the plant equivalent to that induced in the control where IAA was applied in a concentration of 0.1 ppm.
Gibberellin-like effect: the products tested for examples 1 and 3 showed no gibberellin-like (GA-like) effect.
Cytokine-like effect: of the products tested, for examples 1 and 3, only example 3, when a dilution of 1:10000 was applied, showed a cytokine-like (CK-like) response on the plant, equivalent to that induced in the control where BAP was applied in a concentration of 2 ppm.

Example 6: Use of the Composition of this Invention as a Fertiliser

To check the fertiliser effect of the compositions of this invention a field test was carried out on various crops in which the result of the cultivation was compared with the compositions of the invention and the same crops in which the compositions of the invention were not used.

It was found that in some of the tests, mixes were made in the field with other phytosanitary products without signs of any type of problems, thus confirming the functional aspect for the "tank-mix" use of the compositions reported.

Test on crop of nectarines, Big Top variety, in Valdivia (Badajoz). The crop consisted of four blocks of 70 m² with a planting grid of 5 m×2.8 m. Fertigation was used with composition 1 of the invention (example 1) with 40 minutes' irrigation. Three doses of 5 kg/ha of composition 1 of this invention were applied with 10 days between doses, the total dosage in the cycle being 15 L/ha. Table 5 shows the result of the test; as can be seen, composition 1 had an important effect on the average weight of the fruit obtained after the treatment.

TABLE 5 effect of composition 1 on the naphthalene crop - result on fruit.

| | 2nd CROP (kg/ha) | AVERAGE WEIGHT OF FRUIT (g) | AVERAGE CALIBRE OF FRUIT (mm) | PRESSURE (pounds) | ° BRIX |
|---|---|---|---|---|---|
| CONTROL | 14,873 | 147.97 | 66.56 | 9.55 | 10.68 |
| COMPOSITION 1 | 16,773 | 151.81 | 66.77 | 10.11 | 11.07 |

Statistical treatment: LSD All-Pairwise Comparisons Test, Alpha 0.05.

Test on tomato crop, H-8810 variety, with a planting grid of 30,000 plants/ha, in Marisma Lebrija (Seville), drip irrigation. Fertigation was used with composition 1 of the invention (example 1) with 90 minutes' irrigation. A first dose of 5 L/ha was applied with a second dose of 2.5 L/ha after three weeks, the total dosage in the cycle being 7.5 L/ha. Table 6 shows the results of the test which confirmed that the use of composition 1 had an important effect on the increased weight of the complete plant and the average weight of the root.

TABLE 6 effect of composition 1 on the tomato crop

|  | AVERAGE WEIGHT OF THE COMPLETE PLANT (g) | AVERAGE WEIGHT OF THE ROOT (g) |
| --- | --- | --- |
| CONTROL | 71.97 | 6.93 |
| COMPOSITION 1 | 112.59 | 12.34 |

Statistical treatment for the average weight of the complete plant: LSD All-Pairwise Comparisons Test, Alpha 0.05, standard error: 11,445, C.V.: 20,90.

Statistical treatment for the average weight of the root: LSD All-Pairwise Comparisons Test, Alpha 0.05, standard error: 1,5391, C.V.: 22,99.

Test on dry farming of common wheat, Valbona variety, with a seed dose of 200 kg/ha, in Arahal (Seville), with a field size of 6700 m$^2$. Composition 3 was used (example 3) in foliar application with the use of 200 L/ha of liquid. A single dose was applied of 1.5 L/ha. For the treatment, composition 3 (example 3) was mixed with 20% metsulphuron-methyl w/w, post-emergency herbicide with a dosage of 37.5 g/ha, 20% fluroxypyr, post-emergency herbicide with a dosage of 375 cc/ha, alkyl polyglycol (ether) 20% w/v, adherent surfactant with a dosage of 450 cc/ha.

After 6 days from the application of composition 3, no symptoms of phytotoxicity were seen in any of the plants in the crop tested. Table 7 shows the results of this test. As can be seen, the use of composition 3 gave an increase of 3.30% in production compared to the control crop. It also had an important effect on the number of ears and their weight and on protein.

TABLE 7 effect of composition 3 on common wheat crop.

|  | CROP (kg/ha) | No of EARS/m$^2$ | WEIGHT OF EARS/m$^2$ | SPECIFIC WEIGHT | PROTEIN |
| --- | --- | --- | --- | --- | --- |
| CONTROL | 5,113 | 566 | 842 | 82.25 | 12.45 |
| COMPO-SITION 3 | 5,282 | 629 | 976 | 82.63 | 12.23 |

Statistical treatment: LSD All-Pairwise Comparisons Test, Alpha 0.05.

Test on maize crop, PR33Y72 variety (Pioneer) in a plantation in Guadalperales (Badajoz) with drip irrigation, with two doses of 2.5 L/ha of composition 3 (example 3). Volume of liquid: 330 L/ha. For the example, composition 3 was mixed with 2.25% foramsulphuron, post-emergency herbicide, with a dosage of 2.5 L/ha, 4.4% tembotrione w/v (44 g/l) with a dosage of 1.5 L/ha containing isoxadifen ethyl (antidote) 2.2% w/v (22 g/L), post-emergency herbicide.

In the second application, composition 3 was mixed with 1.8% w/v of Abamectina, insecticide, with a dosage of 1 L/ha.

No symptoms of phytotoxicity were seen in the crop after 7 days from the first application nor 7 days after the second application. Table 8 shows the results of this test; as can be seen, the use of composition 3 gave a significant increase in the average weight of the complete plant.

TABLE 8 effect of composition 3 on maize crop.

|  | AVERAGE WEIGHT OF THE COMPLETE PLANT (g) | AVERAGE HEIGHT (cm) |
| --- | --- | --- |
| CONTROL | 354.9 | 153.5 |
| COMPOSITION 1 | 426.2 | 154.25 |

Statistical treatment: LSD All-Pairwise Comparisons Test, Alpha 0.05, standard error for the average weight of the plant: 10,306, C.V.: 3.33 and standard error for the average height of the plant: 1.2255, C.V.: 3.11.

Test on dry farming of barley, Volley variety, in La Mudarra (Valladolid), with a single dose of 1.5 L/ha of composition 3 (example 3). Volume of liquid: 153.1 L/ha. For the treatment composition 3 (example 3) was mixed with 2-4 D acid 60% w/v, EC, post-emergency herbicide, with a dosage of 0.6 L/ha.

At no time were symptoms of phytotoxicity seen in the crop. Table 9 shows the results of this test. As can be seen, the use of composition 3 gave an increase of 26.05% in production compared to the control crop.

TABLE 9 effect of composition 3 on barley crop.

|  | CROP (kg/ha) | No OF EARS/m$^2$ | WEIGHT OF EARS/m2 |
| --- | --- | --- | --- |
| CONTROL | 2,284 | 537 | 288 |
| COMPOSITION 3 | 2,879 | 560 | 348.3 |

Statistical treatment: LSD all-Pairwise Comparisons Test, Alpha 0.05.

The invention claimed is:

1. An aqueous acid solution comprising: leonardite micronized in the aqueous solution comprising surfactants, wherein the solution further comprises amino acids, the solution being for use as at least one of a fertiliser, a biostimulant, and a nutrient, wherein the solution comprises a micronized aqueous dispersion, and wherein the leonardite and amino acids do not precipitate from the solution nor from field application in which the aqueous solution applied has a neutral or acidic pH, and wherein the solution has stable fluidity for up to 14 days.

2. The solution according to claim 1, wherein the surfactants comprise one or more selected from the group consisting of ethoxylated fatty acids, polymeric surfactants, sulphonates, hexitol esters, and sulphocarboxylic type surfactants.

3. The solution according to claim 2, wherein the surfactants comprise one or more selected from the group consisting of iso-alkyl polyglycol ether C3-C13 8 moles of ethylene oxide, calcium lignosulphonate, polyethoxylated sorbitan laurate, and sodium dioctylsulphosuccinate.

4. The solution according to claim 1, further comprising one or more selected from the group consisting of an excipient, an adjuvant, a gelling agent, a defoamer, and a preservative.

5. The solution according to claim 4, wherein the gelling agent is xantham gum.

6. The solution according to claim 4, wherein the defoamer is silicone oil.

7. The solution according to claim 1, wherein the amino acids are selected from acidic or neutral amino acids.

8. The solution according to claim 1, wherein the amino acids are in the form of free amino acids, peptides or polypeptides.

9. The solution according to claim 1, wherein the leonardite has a total humic substance content comprised between 50-80% w/w.

10. The solution according to claim 1, wherein the surfactants comprise one or more selected from the group consisting of iso-alkyl polyglycol ether C3-C13 8MOET, calcium lignosulphonate, polyethoxylated sorbitan laurate, and sodium dioctylsulphosuccinate.

11. The solution according to claim 1, wherein the leonardite provides a humic substance comprising at least one of humic acids and fulvic acids, the humic substance being maintained in its natural acid form, without causing precipitation in either the solution or in applications in the field in which the aqueous solution has a neutral or acidic pH.

12. The solution according to claim 1, wherein the solution has an acidic pH between 3 and 6.

13. The solution according to claim 1, wherein the amino acids are in the form of protein hydrolysate.

14. A method of obtaining the aqueous acid solution according to claim 1, comprising leonardite, amino acids, and surfactants, the solution being for use as at least one of a fertiliser, a biostimulant, and a nutrient, wherein the solution comprises a micronized aqueous dispersion, the method comprising: a) preparing an aqueous solution that contains a defoamer agent and the surfactants; b) adding the amino acids to the aqueous solution; c) adding the leonardite to the aqueous solution and allowing the leonardite to disperse therein to form a dispersion; and d) micronising the dispersion in its liquid form, the solution having an acidic pH between 3 and 6, wherein adding the amino acids occurs at any time before or after micronising the dispersion.

15. The method of claim 14, wherein the leonardite provides a humic substance comprising at least one of humic acids and fulvic acids, the humic substance being maintained in its natural acid form, without causing precipitation in either the solution or in applications in the field in which the aqueous solution has a neutral or acidic pH.

16. The method of claim 15, further comprising: after micronising the dispersion, adding at least one of an excipient, an adjuvant, a gelling agent, a defoamer, and a preservative.

17. The method of claim 14, further comprising: after micronising the dispersion, adding at least one of an excipient, an adjuvant, a gelling agent, a defoamer, and a preservative.

18. The method of claim 14, wherein the defoamer agent is silicone oil.

19. The method of claim 18, wherein the leonardite provides a humic substance comprising at least one of humic acids and fulvic acids, the humic substance being maintained in its natural acid form, without causing precipitation in either the solution or in applications in the field in which the aqueous solution has a neutral or acidic pH.

20. The method of claim 19, further comprising: after micronising the dispersion, adding at least one of an excipient, an adjuvant, a gelling agent, a defoamer, and a preservative.

21. The method of claim 18, further comprising: after micronising the dispersion, adding at least one of an excipient, an adjuvant, a gelling agent, a defoamer, and a preservative.

22. The method of claim 14, wherein the surfactants include at least one of ethoxylated fatty acids, polymeric surfactants, sulphonates, hexitol esters, and sulphocarboxylic type surfactants.

23. The method of claim 22, wherein the leonardite provides a humic substance comprising at least one of humic acids and fulvic acids, the humic substance being maintained in a natural acid form, without causing precipitation in either the solution or in applications in the field in which the aqueous solution has a neutral or acidic pH.

24. The method of claim 23, further comprising: after micronising the dispersion, adding at least one of an excipient, an adjuvant, a gelling agent, a defoamer, and a preservative.

25. The method of claim 22, further comprising: after micronising the dispersion, adding at least one of an excipient, an adjuvant, a gelling agent, a defoamer, and a preservative.

26. The method of claim 22, wherein the surfactants include at least one of iso-alkyl polyglycol ether C3-C13 8MOET, calcium lignosulphonate, polyethoxylated sorbitan laurate, and sodium dioctylsulphosuccinate.

27. The method of claim 26, wherein the leonardite provides a humic substance comprising at least one of humic acids and fulvic acids, the humic substance being maintained in a natural acid form, without causing precipitation in either the solution or in applications in the field in which the aqueous solution has a neutral or acidic pH.

28. The method of claim 27, further comprising: after micronising the dispersion, adding at least one of an excipient, an adjuvant, a gelling agent, a defoamer, and a preservative.

29. The method of claim 26, further comprising: after micronising the dispersion, adding at least one of an excipient, an adjuvant, a gelling agent, a defoamer, and a preservative.

30. The method of claim 14, wherein the amino acids are selected from acidic or neutral amino acids.

31. The method of claim 30, wherein the leonardite provides a humic substance comprising at least one of humic acids and fulvic acids, the humic substance being maintained in a natural acid form, without causing precipitation in either the solution or in applications in the field in which the aqueous solution has a neutral or acidic pH.

32. The method of claim 31, further comprising: after micronising the dispersion, adding at least one of an excipient, an adjuvant, a gelling agent, a defoamer, and a preservative.

33. The method of claim 30, further comprising: after micronising the dispersion, adding at least one of an excipient, an adjuvant, a gelling agent, a defoamer, and a preservative.

34. The method of claim 14, wherein the amino acids comprise free amino acids, peptides, or polypeptides.

35. The method of claim 34, wherein the leonardite provides a humic substance comprising at least one of humic acids and fulvic acids, the humic substance being maintained in a natural acid form, without causing precipitation in either the solution or in applications in the field in which the aqueous solution has a neutral or acidic pH.

36. The method of claim 35, further comprising: after micronising the dispersion, adding at least one of an excipient, an adjuvant, a gelling agent, a defoamer, and a preservative.

37. The method of claim 34, further comprising: after micronising the dispersion, adding at least one of an excipient, an adjuvant, a gelling agent, a defoamer, and a preservative.

38. The method of claim 14, wherein the leonardite has a total humic substance content comprised between 50% w/w to 80% w/w.

39. The method of claim 38, wherein the leonardite provides a humic substance comprising at least one of humic acids and fulvic acids, the humic substance being maintained in a natural acid form, without causing precipitation in either the solution or in applications in the field in which the aqueous solution has a neutral or acidic pH.

40. The method of claim 39, further comprising: after micronising the dispersion, adding at least one of an excipient, an adjuvant, a gelling agent, a defoamer, and a preservative.

41. The method of claim 38, further comprising: after micronising the dispersion, adding at least one of an excipient, an adjuvant, a gelling agent, a defoamer, and a preservative.

42. The method of claim 14, wherein the surfactants include at least one of iso-alkyl polyglycol ether C3-C13 8MOET, calcium lignosulphonate, polyethoxylated sorbitan laurate, and sodium dioctylsulphosuccinate.

43. The method of claim 42, wherein the leonardite provides a humic substance comprising at least one of humic acids and fulvic acids, the humic substance being maintained in a natural acid form, without causing precipitation in either the solution or in applications in the field in which the aqueous solution has a neutral or acidic pH.

44. The method of claim 43, further comprising: after micronising the dispersion, adding at least one of an excipient, an adjuvant, a gelling agent, a defoamer, and a preservative.

45. The method of claim 42, further comprising: after micronising the dispersion, adding at least one of an excipient, an adjuvant, a gelling agent, a defoamer, and a preservative.

46. The method of claim 14, wherein the solution further comprises at least one of an excipient, an adjuvant, a gelling agent, a defoamer, and a preservative.

47. The method of claim 46, wherein the leonardite provides a humic substance comprising at least one of humic acids and fulvic acids, the humic substance being maintained in its natural acid form, without causing precipitation in either the solution or in applications in the field in which the aqueous solution has a neutral or acidic pH.

48. The method of claim 47, further comprising: adding the at least one excipient, adjuvant, gelling agent, defoamer, and preservative.

49. The method of claim 46, further comprising: adding the at least one excipient, adjuvant, gelling agent, defoamer, and preservative.

50. The method of claim 46, wherein the gelling agent comprises xantham gum.

51. The method of claim 50, wherein the leonardite provides a humic substance comprising at least one of humic acids and fulvic acids, the humic substance being maintained in its natural acid form, without causing precipitation in either the solution or in applications in the field in which the aqueous solution has a neutral or acidic pH.

52. The method of claim 51, further comprising: adding the at least one excipient, adjuvant, gelling agent, defoamer, and preservative.

53. The method of claim 50, further comprising: adding the at least one excipient, adjuvant, gelling agent, defoamer, and preservative.

* * * * *